United States Patent [19]
Iida

[11] Patent Number: 5,859,643
[45] Date of Patent: Jan. 12, 1999

[54] LOWERING GEOMETRIC DRAWING RESOLUTION BY FILTERING OUT DATA BASED ON THRESHOLD VALUES TO INCREASE RETRIEVAL SPEED

[75] Inventor: Masahiro Iida, Kawasaki, Japan

[73] Assignee: Fujitsu Limited, Kawasaki, Japan

[21] Appl. No.: 462,559

[22] Filed: Jun. 5, 1995

Related U.S. Application Data

[63] Continuation of Ser. No. 932,215, Aug. 19, 1992, abandoned.

[30] Foreign Application Priority Data

Aug. 20, 1991 [JP] Japan .................................. 3-208296

[51] Int. Cl.$^6$ ...................................................... G06T 11/20
[52] U.S. Cl. .............................................................. 345/441
[58] Field of Search ................................... 395/100, 118, 395/128, 141, 142, 143, 147–148, 152–155, 161, 763, 769, 779, 788, 326, 339; 345/133, 149

[56] References Cited

U.S. PATENT DOCUMENTS

| | | | |
|---|---|---|---|
| Re. 33,316 | 8/1990 | Katsuta et al. | 345/428 |
| 4,291,380 | 9/1981 | Rohner | 345/428 |
| 4,816,914 | 3/1989 | Ericsson | 348/405 |
| 4,847,689 | 7/1989 | Yamamoto et al. | 358/515 |
| 4,907,188 | 3/1990 | Suzuki et al. | 395/200.49 |
| 4,928,243 | 5/1990 | Hodges et al. | 707/502 |
| 4,933,865 | 6/1990 | Yamamoto et al. | 382/203 |
| 4,949,279 | 8/1990 | Takakura et al. | 345/418 |
| 5,001,576 | 3/1991 | Tanaka et al. | 358/462 |
| 5,068,909 | 11/1991 | Rutherford et al. | 382/302 |
| 5,070,534 | 12/1991 | Lascelles et al. | 345/348 |
| 5,091,974 | 2/1992 | Sasahara et al. | 382/235 |
| 5,093,907 | 3/1992 | Hwong et al. | 345/473 |
| 5,123,087 | 6/1992 | Newell et al. | 345/348 |
| 5,133,052 | 7/1992 | Bier et al. | 707/530 |
| 5,151,974 | 9/1992 | Tani et al. | 345/428 |
| 5,197,120 | 3/1993 | Saxton et al. | 345/439 |
| 5,265,197 | 11/1993 | Kondo | 345/420 |
| 5,321,803 | 6/1994 | Ditter, Jr. | 345/335 |
| 5,353,397 | 10/1994 | Yokoyama et al. | 707/502 |
| 5,367,622 | 11/1994 | Coggins | 345/356 |
| 5,371,845 | 12/1994 | Newell et al. | 345/347 |
| 5,444,825 | 8/1995 | Bain et al. | 345/443 |

FOREIGN PATENT DOCUMENTS

A-62-236077  10/1987  Japan .
2-168298  6/1990  Japan .

OTHER PUBLICATIONS

Parker, Using Aldus Pagemaker, 1987, Chapter 4, pp. 75–99.
Jensen et al., Harvard Graphics: The Complete Reference, 1990, pp. 271–273, 300–305, 1990.

*Primary Examiner*—Anton Fetting
*Attorney, Agent, or Firm*—Staas & Halsey

[57] ABSTRACT

A method for displaying drawings with a CAD system. The CAD system includes a drawing storage unit which stores a plurality of drawings, a display apparatus and a display control unit which causes a respective drawing to be retrieved from the drawing storage unit and displayed on the display apparatus. Each drawing stored in the drawing storage unit includes at least one graphic form, there being a plurality of different types of graphic forms and predetermined reduction rules correspond, respectively, to each type of graphic form. The method includes the steps of (a) reading a respective drawing from the drawing storage unit; (b) storing the respective drawing in the display control unit; (c) reducing each graphic form of the drawing in accordance with the reduction rules corresponding to the respective graphic form; and (d) displaying the respective drawing on the display apparatus with the graphic forms of the drawing being reduced in accordance with the corresponding reduction rules.

22 Claims, 12 Drawing Sheets

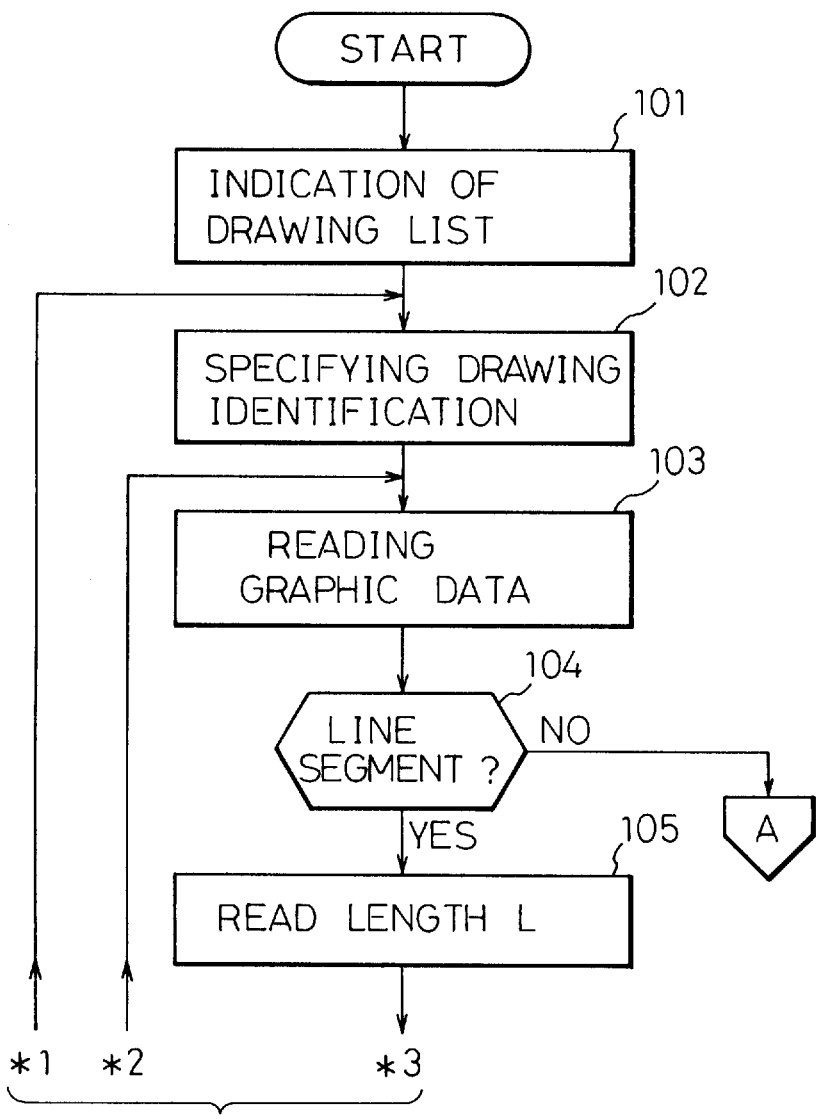

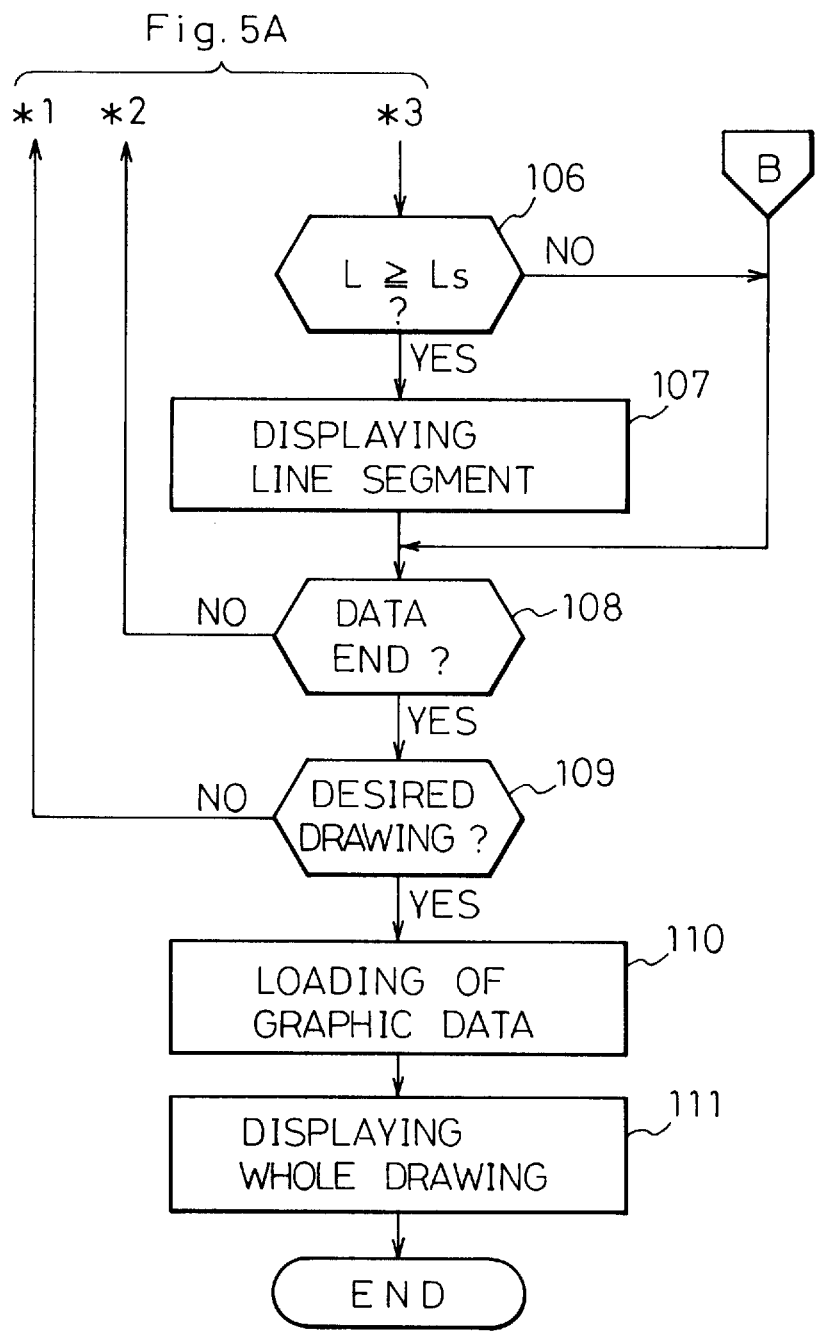

LOWERING GEOMETRIC DRAWING RESOLUTION BY FILTERING OUT DATA BASED ON THRESHOLD VALUES TO INCREASE RETRIEVAL SPEED

This application is a continuation of application Ser. No. 07/932,215, filed Aug. 19, 1992, now abandoned.

BACKGROUND OF THE INVENTION

1. Field of the Invention

The present invention relates to a method for displaying drawings in a computer-aided design (CAD) system.

In recent years, along with the spread of CAD systems, the number of drawings managed by CAD systems has risen to a considerable level, for example, several hundred to several thousand or more. For this reason, it has become difficult for designers to remember which drawing identifications match which drawing contents. This has led to various inconveniences. Resolution of this problem is demanded.

2. Description of the Related Art

Conventional CAD systems are provided with a drawing loading function. With such a drawing loading function, it is possible to read out a desired drawing from a hard disk or other large volume storage device and display it on a display apparatus just by designation of the drawing identification. When forgetting the drawing identification of the desired drawing, it is possible to display a list of drawings in the menu region of the screen display, designate and display successively one drawing at a time, and view the displayed drawings so as to confirm which is the desired drawing.

In the conventional drawing loading function, however, all the information of the drawings was displayed on the screen display. Therefore, it took a long time until a drawing was displayed on the screen display. In particular, it took a long time to display more complicated drawings (ones with more graphic elements). There was the problem that it was not possible to obtain a match of the drawing content with the drawing identification in a short time and this led to a reduction in work efficiency.

SUMMARY OF THE INVENTION

Therefore, the object of the present invention is to make it possible, when wishing to display a desired drawing on a screen display by the above-mentioned drawing loading function, to quickly find the desired drawing from among a large number of drawings and to display it on the screen display.

To attain the above object, the present invention newly defines a command for retrieval of drawings as a type of conventional drawing loading command for executing the above drawing loading.

When this drawing retrieval command is issued by an operator, the CAD workstation modifies the graphic data read out from a drawing storage unit and reduces the amount of information of the graphic data.

Due to this drawing retrieval command, the amount of information of the graphic data given to the display apparatus is made far smaller than the amount of information of the graphic data given to the display apparatus by a normal drawing loading command, so the time required for display of the designated graphic data on the screen display of the display apparatus can be shortened by that amount. Therefore, a high speed display is obtained.

In this case, the figure which is transferred to the display screen must not become unrecognizable to the operator due to the reduction of the amount of the graphic data. Thus, the reduction of the amount of information must be performed under predetermined display conditions. That is, it is necessary to try to reduce the amount of data within a range where the figure remains recognizable. Therefore, the present invention provides a method for displaying drawings which simplifies the content of drawings to a recognizable extent and displays the same at a high speed.

BRIEF DESCRIPTION OF THE DRAWINGS

The above object and features of the present invention will be more apparent from the following description of the preferred embodiments with reference to the accompanying drawings, wherein:

FIGS. 5A, 5B, 5C, 5D, 5E, and 5F are flow charts showing the control of the screen display based on the present invention;

DESCRIPTION OF THE PREFERRED EMBODIMENTS

The embodiments of the present invention will be described next with reference to the related figures.

Figure 1:
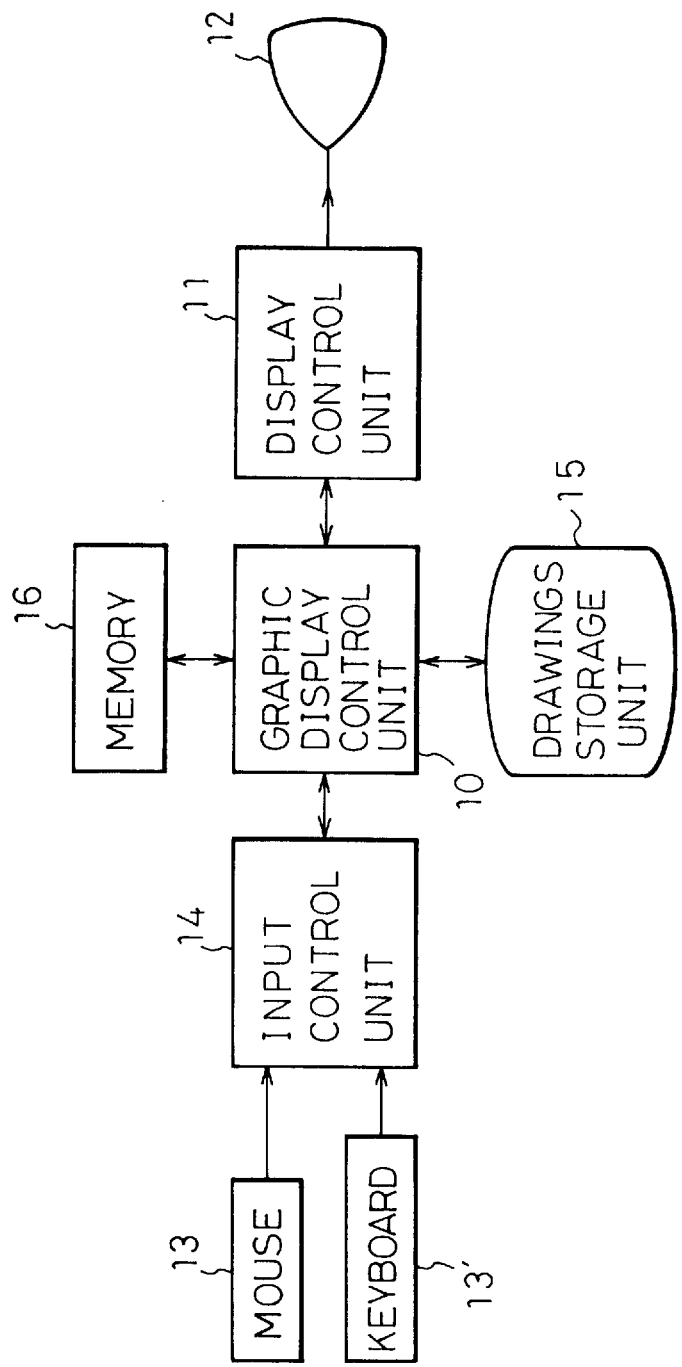
FIG. 1 is a view of an example of the overall constitution of a known CAD system to which the present invention is applied.

FIG. 1 is a view of an example of the overall constitution of a known CAD system to which the present invention is applied. In the figure, the CAD system is comprised of a CAD workstation and its peripheral units. The CAD workstation mainly includes a graphic display control unit 10, a display control unit 11, an input control unit 14, and a memory 16. Further, the peripheral units include a display apparatus 12, a mouse 13, a keyboard 13', and a drawing storage unit 15.

The drawing storage unit 15 stores the graphic data corresponding to different drawings. In general, it is comprised of a hard disk unit. The graphic display control unit 10 is the heart of the CAD workstation and cooperates with the memory 16 to give the graphic data from the drawing storage unit 15 through the display control unit 11 to the display apparatus 12 and display the figure on a screen display of a CRT or liquid crystal panel.

The control information and commands for the graphic display are input from the mouse 13 or keyboard 13' and are applied through the input control unit 14 to the graphic display control unit 10.

Figure 2:
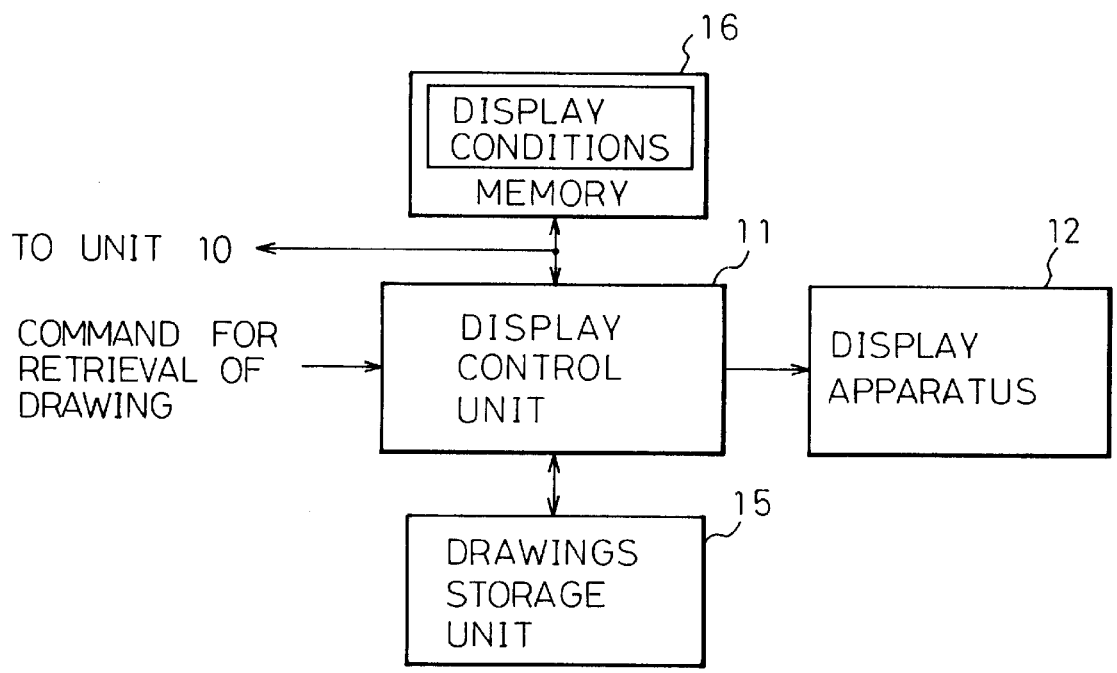
FIG. 2 is a view schematically showing the functional portion for performing the method of the present invention.

FIG. 2 is a view schematically showing the functional portion for performing the method of the present invention. Note that throughout the figures, similar components are indicated by the same reference numerals or symbols.

When a drawing retrieval command based on the present invention is given by an operator from the input control unit

(14) side of FIG. 1, the display control unit 11 refers to the display conditions prestored in the memory 16 and processes the graphic data read out from the drawing storage unit 15. This processing is for reducing the amount of information of the graphic data. Therefore, graphic data having an amount of information which is small and which is of an extent whereby the content of the drawing can be recognized is applied to the display apparatus 12 and then the figure is drawn on the screen display.

Figure 3:
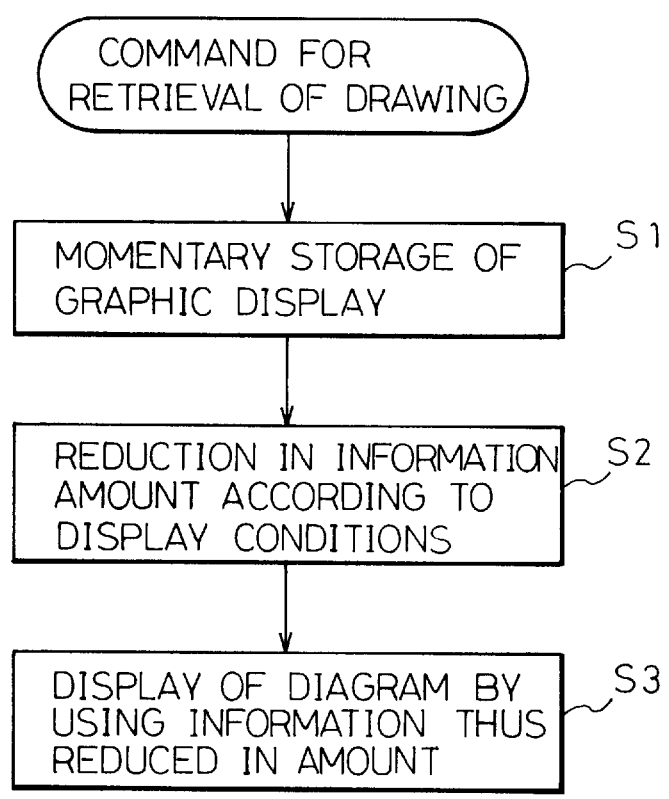
FIG. 3 is a flow chart showing the basic steps based on the present invention in the constitution of FIG. 2.

FIG. 3 is a flow chart showing the basic steps based on the present invention in the constitution of FIG. 2. That is, the CAD system of the present invention operates according to the following steps:

a) a first step S1 of responding to a drawing retrieval command, reading out the graphic data from the drawing storage unit 15, and once storing the same in the display control unit 11, b) a second step S2 of reducing the amount of information of the graphic data stored once, based on predetermined display conditions, and c) a third step S3 of displaying the figure on the display apparatus 12, based on the graphic data reduced in amount of information.

Here, the most preferable display condition is a rule regarding the omission of the display of graphic elements or the simplification of the display of the same for each of the plurality of types of graphic elements constituting the graphic data.

In the above way, according to the present invention, graphic data is stored in the drawing storage unit 15 corresponding to drawing identifications, display conditions for determining whether to display graphic elements for each of the graphic elements (line segments, circles, arcs, letters, free lines, etc.) or conditions for simplified display are set and the display conditions stored in the memory 16, the drawing to be displayed is designated, and the display control unit 11 successively reads the graphic data of the designated drawing, refers to the display conditions corresponding to each of the graphic elements to determine whether to display them or not display them or to display them simplified, and makes a simplified display of the drawing in the screen display of the display apparatus 12 based on that decision.

In this way, it is possible to achieve a high speed display by displaying the drawing simplified to a recognizable extent and, further, it is possible to confirm the content of the drawings in a short time and therefore possible to raise work efficiency. In particular, (1) when the graphic element is a line segment, it is displayed only when its length is over a predetermined threshold value, (2) when the graphic element is a circle or an arc, it is displayed only when its radius is over a predetermined threshold value, and (3) when the graphic element is a letter, it is displayed simplified in a block (rectangular) form corresponding to the size of the letter. By setting such display conditions, it is possible to simplify the content of the drawings to a recognizable extent and display the same at a high speed.

That is, when the graphic element is a line segment of the figure, the display condition is a rule relating to the length of the line segment, and, based on the rule, display of the line segment is not omitted when the length is longer than a predetermined threshold value and the display of the line segment is omitted when the length is shorter than the predetermined threshold value.

When the graphic element is a circle or arc of a figure, the display condition is a rule relating to the magnitude of the radius of the circle or arc, and, based on the rule, display of the circle or arc is not omitted when the magnitude of the radius is larger than a predetermined threshold value and the display of the circle or arc is omitted when the magnitude of the radius is smaller than the predetermined threshold value.

When the graphic element is a letter, the display condition is a rule relating to whether to omit the display of the letter or to replace the letter with a simple block and display the same.

When the graphic element is a free line, the display condition is a rule relating to whether to omit the display of the free line or to display it as is.

When the graphic element is a dimensional value, the display condition is a rule relating to whether to omit the display of the dimensional value or to display it as is.

When the graphic element is attribution information of the figure, the display condition is a rule relating to the attribution information and decides whether to follow standardized attribution information for all the graphic elements.

Note that specific examples of the above graphic elements (except attribution information) are shown later using the drawings. The attribution information is information for designating the line thickness, color, etc. of the figure.

Figure 4:
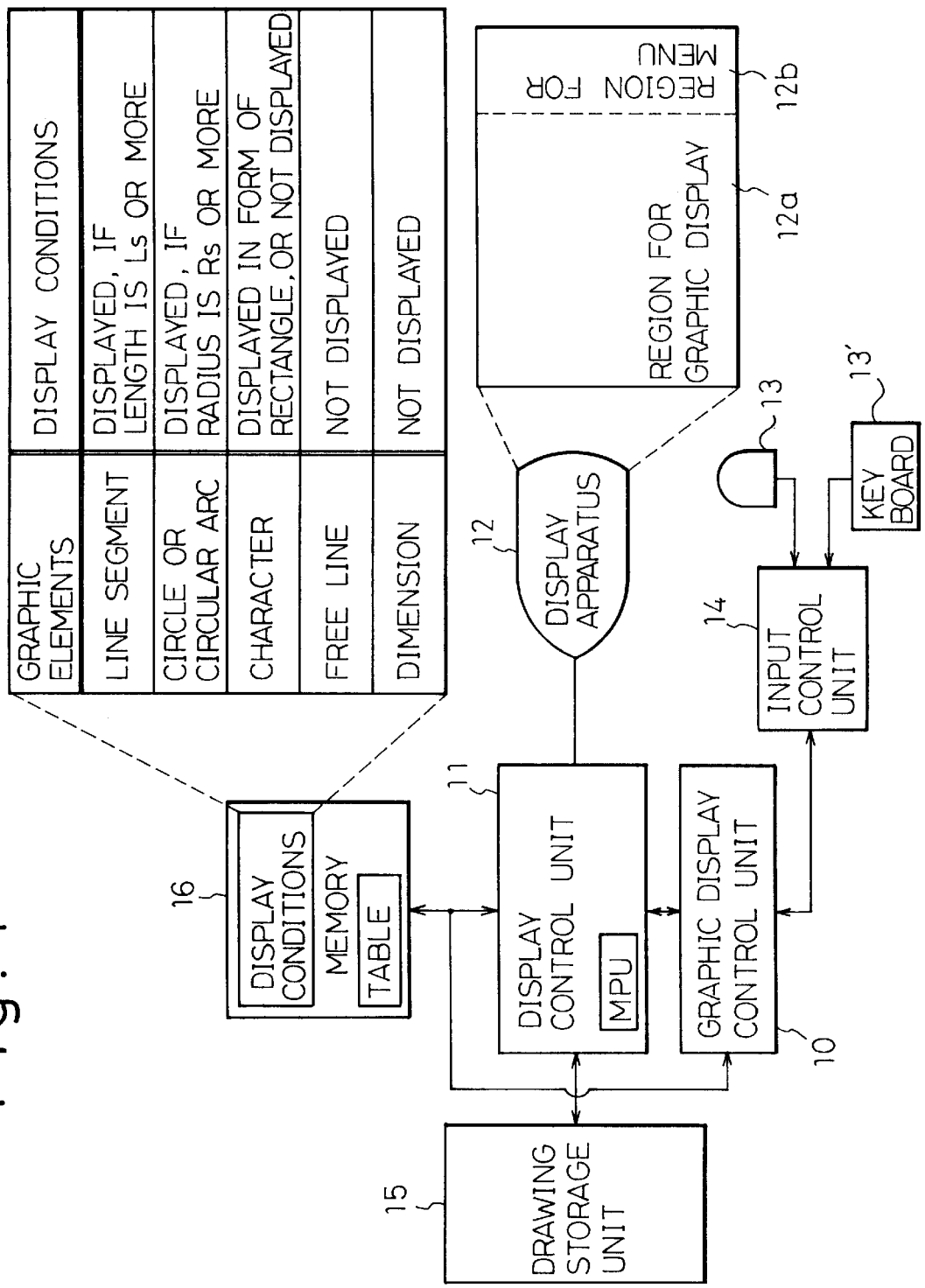
FIG. 4 is a view showing in more detail the constitution of FIG. 2.
Figure 5C:
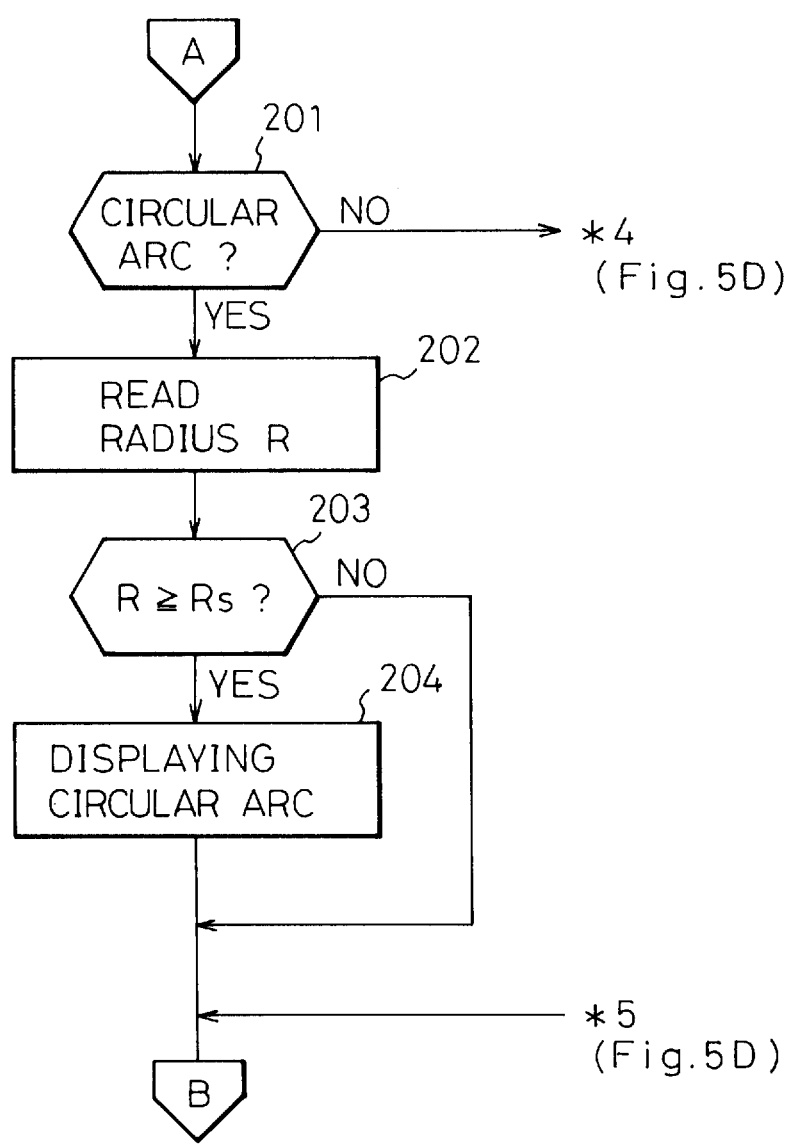
Figure 5D:
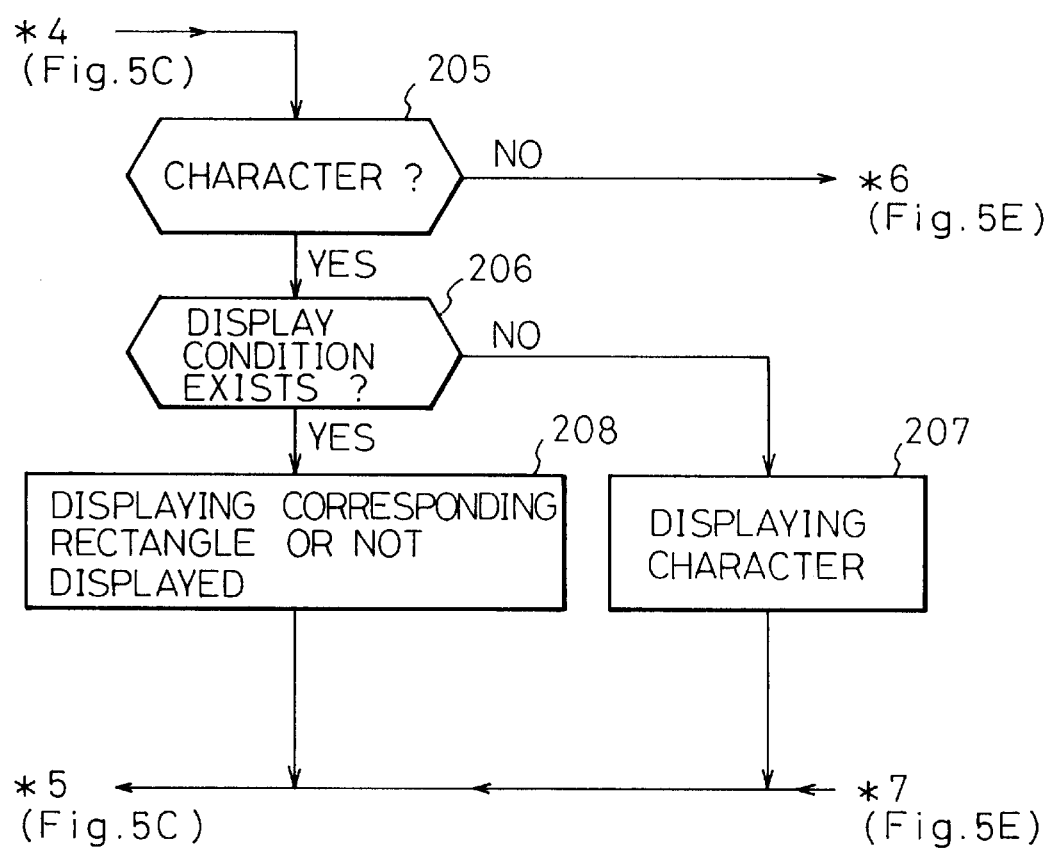
Figure 5E:
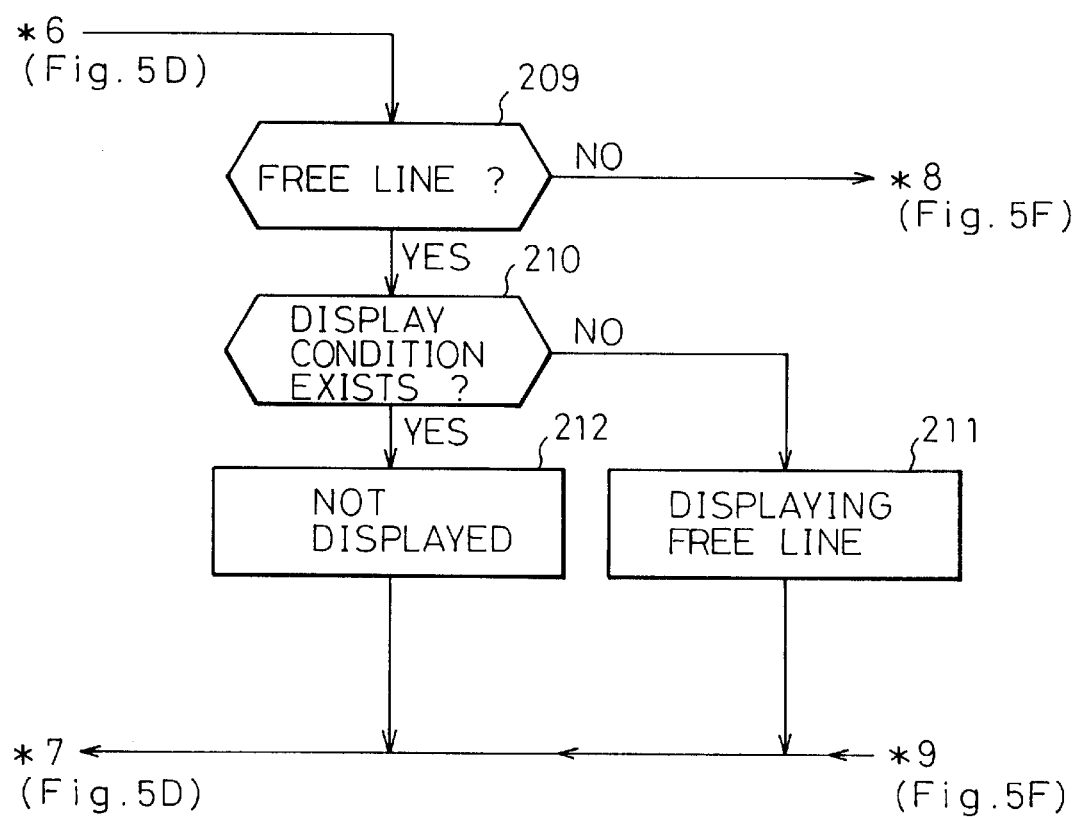
Figure 5F:
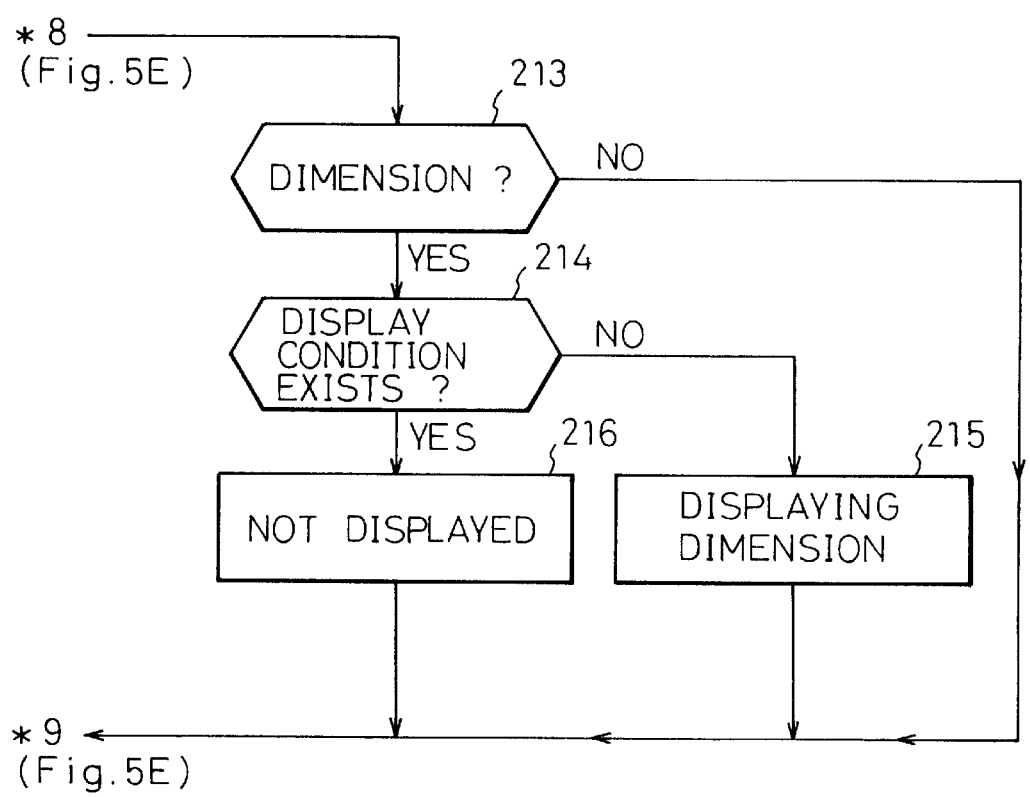

FIG. 4 is a view showing in more detail the constitution of FIG. 2. In the figure, the display control unit 11 comprises a microprocessor (MPU). The screen display of the display apparatus 12 is divided into a graphic display region 12a and a menu region 12b.

The mouse 13 has switches, not shown, and a track ball. By turning the track ball, the cursor on the screen is moved and coordinate input or menu commands are picked up and input.

The input control unit 14 generates a movement signal for moving the cursor in various axial directions in accordance with the rotation of the track ball of the mouse 11 and outputs the on/off state of the switches.

The drawing storage unit 15 is a hard disk unit which stores drawings (graphic data) corresponding to drawing identifications. The graphic data is prepared for each of the line segments, circles and arcs, letters, free lines, dimensional values, and other graphic elements. The graphic data each include data specifying the graphic elements. For example, in the case of a series of letters, data showing the fact of being a letter and the longitudinal and lateral dimensions of the letter is placed before the letter data. In the case of a free line, data showing that the data is of a free line is placed before the free line data. In the case of a circle, a code showing that the data is of a circle, coordinates of the center of the circle, and data showing the radius of the circle are placed. In particular, in the case of an arc, data showing the coordinates expressing the starting point and end point is also placed.

The memory 16, which stores the display conditions, has a table of display conditions as to whether to display graphic elements for each graphic element and of whether or not to make a simplified display. For example, the memory 16 has stored in it display conditions set for each graphic element, e.g., (1) When the graphic element is a line segment, "display only when the length is more than the predetermined threshold value $L_s$".

(2) When the graphic element is a circle or an arc, "display only when the radius is more than the predetermined threshold value $R_s$".

(3) When the graphic element is a letter, "display or not display by a block corresponding to the size of the letter".

(4) When the graphic element is a free line, "do not display at all".

(5) When the graphic element is a dimensional value, "do not display at all".

Further, in the CAD system, use is not made of letter fonts. The letter images are expressed by vector information. Therefore, it takes time until letters are completely displayed. If the letters are shown by simple blocks, however, the display time can be shortened.

FIGS. 5A, 5B, 5C, 5D, 5E, and 5F are flow charts showing the control of the screen display based on the present invention. An explanation will be made of the case where the display condition shown in FIG. 4 is set. Further, it will be assumed for convenience of the explanation that the display conditions are set at all times for line segments and circles and arcs.

When a drawing retrieval command is selected from the menu region 12b by the mouse 13, the display control unit 11 displays the list of drawings in the menu region 12b (FIG. 6) (step 101). Further, the attributes of the drawing (type of industry, series of letters of drawing identification, etc.) may be input to display only the necessary list of drawings.

Figure 6:
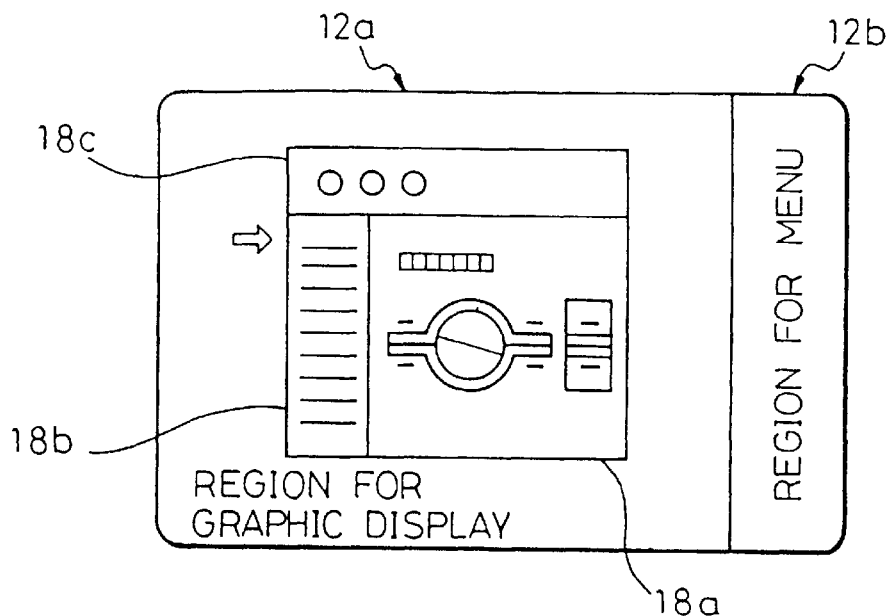
FIG. 6 is a view showing a window superimposed in a screen display.

FIG. 6 is a view showing a window superimposed in a screen display. The window (18a, 18b, and 18c) has already been loaded and is temporarily superimposed on the figure filling the screen display. Among the three regions 18a, 18b, and 18c forming the window, the menu region 18b has the drawing list displayed in it. A group of drawing identifications is listed in several columns in region 18b. The region 18c shows the name of the group of the drawings. The region 18a shows a simplified figure—the point of the present invention. That is, the region 18a is the simplified drawing display region.

In this way, the window is divided into at least two regions, in one region (18b) of which the drawing identifications of a plurality of groups of graphic data desired to be searched through by the drawing retrieval command are listed up, these then being designated one by one and figures corresponding to the designated, reduced information graphic data being successively displayed in the other region (18a) of the window.

Further, the graphic data displayed in the window are successively searched, the search is stopped when the desired figure appears (step 109 of FIG. 5B), the command is switched by the mouse 13 from the drawing retrieval command to the original drawing loading command, the graphic data is read out from the drawing storage unit 15, and the result is displayed on the full screen display with the above window (18a, 18b, 18c) eliminated.

Returning now to FIG. 5A, when the drawing identification of the drawing desired to be displayed is designated by the mouse 13 from the drawing list (area 18b) (step 102), the display control unit 11 reads the graphic data corresponding to the designated drawing identification from the drawing storage unit 15 and stores it in the built-in memory (step 103).

Suitably thereafter, the graphic data is read out from the start and it is judged if the data is line segment data (step 104). If line segment data, the length L is read out and the magnitude of the length L and the predetermined threshold value $L_s$ are compared (steps 105 and 106).

If the length L is not larger than the predetermined threshold value ($L \geq L_s$), the line segment is displayed in the graphic display region 18a based on the graphic data, while when the length L is smaller than the predetermined threshold level ($L<L_s$), the line segment is not displayed (step 107).

On the other hand, at step 104, if the data is not a line segment, it is judged if it is a circle or arc data (step 201).

If a circle or arc data, the radius R is calculated and the magnitude of the radius R and the predetermined threshold value $R_s$ are compared (step 202 and 203).

If the radius R is not larger than the predetermined threshold value ($R \geq R_s$), the circle or arc is displayed in the graphic display region 18a based on the graphic data, while if the radius R is smaller than the predetermined threshold value ($R<R_s$), the circle or arc is not displayed (step 204).

If the graphic data is not circle or arc data in the determination of step 201, it is judged if the data is letter data (step 205). If letter data, the "display condition of letters" is referred to and a determination is made as to if the condition is set (step 206). When the condition is not set, the letter is generated and displayed (step 207), while when the condition is not set, a block of a size shown by the longitudinal and lateral dimensions of the letter designated is displayed based on the condition "display by block" (step 208).

If the graphic data is not letter data at the determination of step 205, it is judged if the data is free line data (step 209). If free line data, the "free line display condition" is referred to and it is judged if the condition is set (step 210). If the condition is not set, the free line is not displayed in accordance with the condition "do not display at all" (step 212). If the graphic data is not free line data at the determination of step 209, it is judged if the data is dimensional data and similar processing is performed as with free lines (step 213, 214, 215, and 216).

If the above processing is performed on the graphic data, it is judged if the processing has been performed for all the graphic data (step 108). If not, the routine returns to step 103, where the next graphic data is read and the following processing is repeated.

Figure 7:
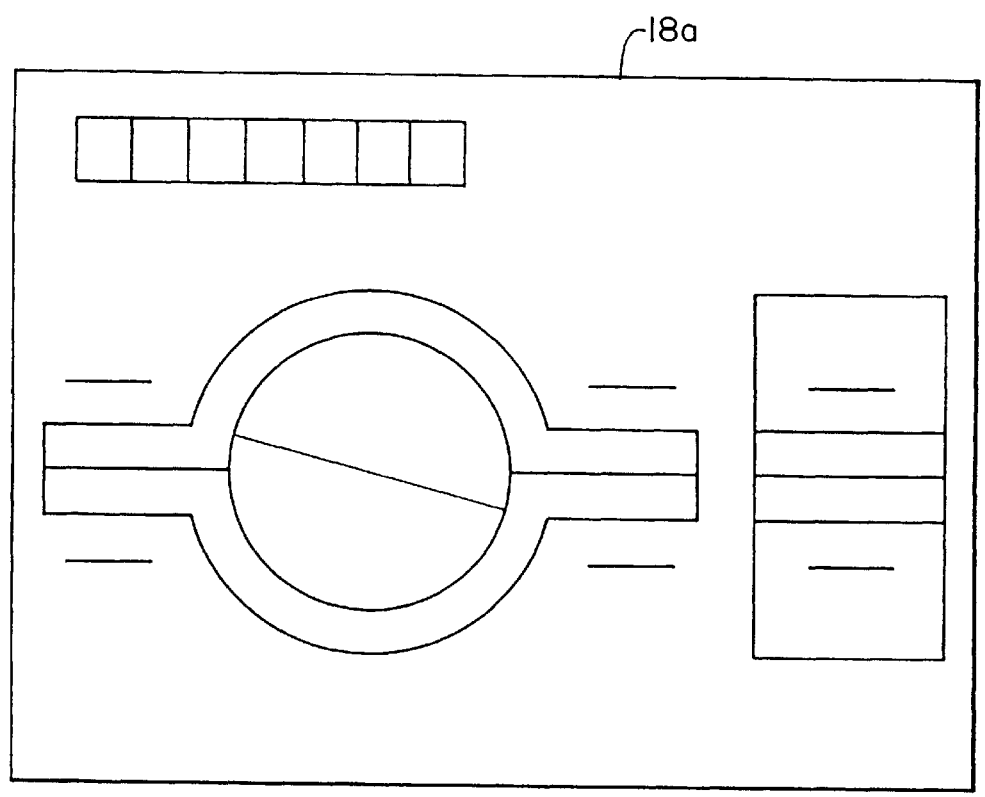
FIG. 7 is a view showing an example of a figure simplified by the present invention.

FIG. 7 is a view showing an example of a figure simplified by the present invention. Note that the drawing is the same as the drawing in the window (18a) shown as an example in FIG. 6.

Figure 8:
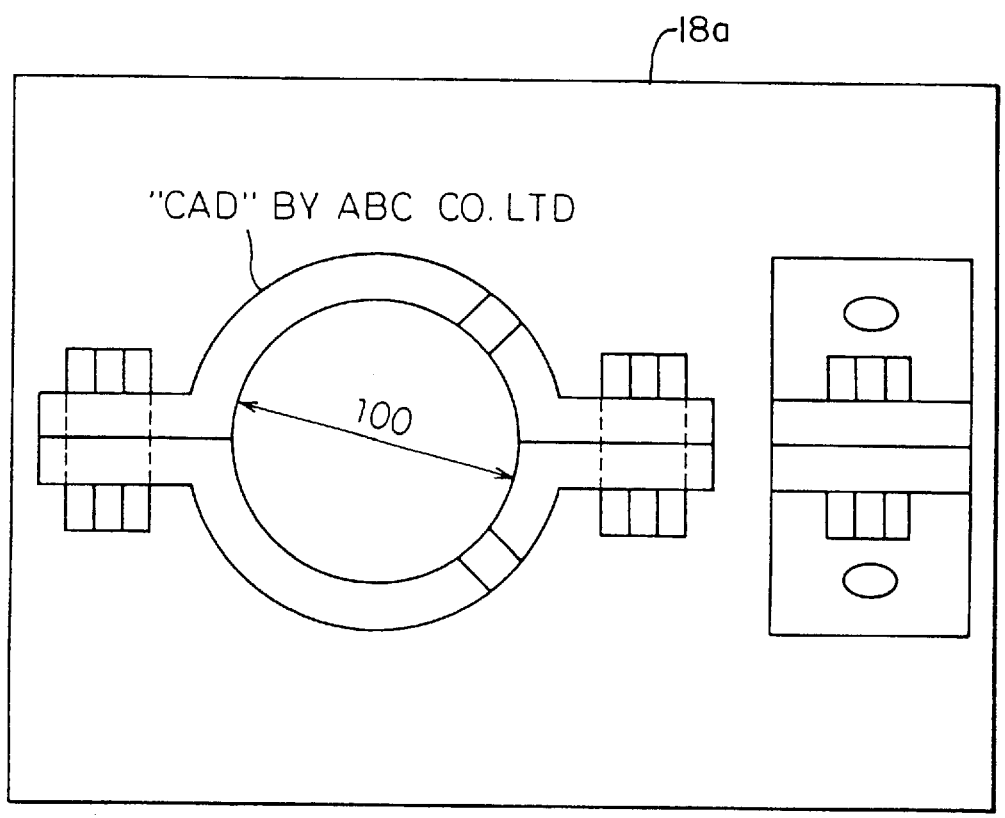
FIG. 8 is a view showing the original figure of the figure shown in FIG. 7.

The fact that the figure shown in FIG. 7 is a simplified figure will be apparent at first glance when viewing FIG. 8.

FIG. 8 is a view showing the original figure of the figure shown in FIG. 7. The short line segments shown in FIG. 8 have been erased, the small circles have been erased, the letters have been replaced by blocks, the free line (S-shaped lead) has been erased, the dimensional value (100) has been erased as well, and therefore the figure in FIG. 7 has been changed to a simple figure overall.

Further, in the simplified drawing display, no attributes of color or line thickness etc. are given, so the display is of a single color and fixed line thickness.

Also, the display conditions may be suitably changed. For example, they may be changed by displaying a display condition setting menu in the menu region.

Further, there are features of drawings specific to industries or fields, such as mechanical design drawings or electrical design drawings, so it is also possible to set in advance the display conditions for separate industries and to use predetermined display conditions in accordance with the drawings displayed so as to make the simplified display.

That is, the predetermined threshold value of the length can be suitably changed.

The predetermined threshold value of the magnitude of the radius can be suitably changed.

The rule of whether or not to omit the display of the letter is determined in accordance with the industry or field in which the drawing to be displayed in handled.

When the letter is replaced with a simple block which is then displayed, the graphic data specifying the region of the letter is referred to and the size matching that region is made the size of the block.

The rule of whether to omit the display of a free line or to replace the letter with a simple block which is then displayed is determined in accordance with the industry or field in which the drawing to be displayed is handled.

Whether or not to omit the display of the dimensional values is determined in accordance with the industry or field in which the drawing to be displayed in handled.

For example, in a CAD system used in an industry or field handling mechanical design drawings, experience shows that there are an extremely large number of line segments in the graphic elements, so it is desirable to select the length $L_s$ in the above display condition to be as large as possible. Information relating to this is stored in the table in FIG. 4.

On the other hand, in a CAD system used in an industry or field handling electrical design drawings, experience shows that there are an extremely large number of circles or arcs among the graphic elements, so the radius $R_s$ in the display condition is preferably selected to be as large as possible. Information relating to this is stored in the table in FIG. 4 as well.

The present invention was explained above by embodiments, but the present invention can be modified in various ways within the scope of the invention described in the claims and does not exclude these modifications.

According to the present invention, by constituting things so that display conditions are set as to whether to display graphic elements for each graphic element and conditions as to whether to make a simplified display and, when displaying a designated drawing, omitting or displaying graphic elements of the drawing in accordance with the display conditions or making a simplified display so as to display the drawing on the screen display, it is possible to display the drawing simplified to an extent where its content is recognizable, so the drawing can be displayed at a high speed and it is possible to confirm the content of the drawing in a short time so it is possible to raise the work efficiency.

Further, according to the present invention, the display conditions are set so that when the graphic element is a line segment, it is displayed only when the length is over a predetermined threshold value and when the graphic element is a circle or arc, it is displayed only when the radius is above a predetermined threshold value, so it is possible to easily modify the extent of the simplification by just changing the predetermined threshold value so it is possible to set a suitable degree of simplification in accordance with the drawings and display a drawing at a high speed.

Further, according to the present invention, by constituting things so that when the graphic element is a letter, it is displayed simplified as a block corresponding to the size of the letter, it is possible to shorten the time required for display of letters and display the drawing at a higher speed.

Still further, according to the present invention, by setting display conditions for whether to display graphic elements for each of the line segments, circles or arcs, letters, free lines, and dimensional values and conditions as to whether to make a simplified display, it is possible to make a suitable simplified display according to the drawings.

I claim:

1. A method for displaying drawings with a CAD system, the CAD system comprising a display apparatus and a drawing storage unit which stores a plurality of drawings, each drawing stored in the drawing storage unit and defined at least by shape and size value, there being a plurality of different shapes of graphic forms and a predetermined display condition of the size value corresponds, respectively, to each of the shapes of the graphic forms, the method comprising the steps of:

reading a respective drawing from the drawing storage unit;

comparing said size value of each graphic form of the drawing in accordance with the display condition of the size value corresponding to the respective graphic form; and displaying the respective drawing on the display apparatus with the graphic forms of the drawing whose size value is not smaller than the corresponding display condition of the size value, wherein:

the plurality of different shapes of graphic forms comprise line segments; and the display conditions corresponding to line segments require that a respective line segment is displayed when the length of the line segment is longer than a predetermined threshold value and that the line segment is not displayed when the length of the line segment is shorter than the predetermined threshold value, said display conditions variable by industry, and each graphic form being displayed based upon the display conditions stored in a table in memory.

2. A method for displaying drawings with a CAD system, the CAD system comprising a display apparatus and a drawing storage unit which stores a plurality of drawings, each drawing stored in the drawing storage unit and defined at least by shape and size value, there being a plurality of different shapes of graphic forms and predetermined display conditions of the size value correspond, respectively, to each of the shapes of the graphic forms, the method comprising:

reading a respective drawing from the drawing storage unit;

comparing said size value of each graphic form of the drawing in accordance with the display condition of the size value corresponding to the respective graphic form; and displaying the respective drawing on the display apparatus with the graphic forms of the drawing whose size value is not smaller than the corresponding display condition of the size value, wherein:

the plurality of different shapes of graphic forms comprise circles or arcs; and the display conditions corresponding to circles or arcs require that a respective circle or arc is displayed when the magnitude of the radius of the circle or arc is larger than a predetermined threshold value and that the circle or arc is not displayed when the magnitude of the radius of the circle or arc is smaller than the predetermined threshold value, said display conditions variable by industry, and each graphic form being displayed based upon the display conditions stored in a table in memory.

3. A method for displaying drawings with a CAD system, the CAD system comprising a display apparatus and a drawing storage unit which stores a plurality of drawings, each drawing stored in the drawing storage unit and defined at least by shape and size value, there being a plurality of different shapes of graphic forms and predetermined display conditions of the size value correspond, respectively, to each of the shapes of the graphic forms, the method comprising:

reading a respective drawing from the drawing storage unit;

comparing said size value of each graphic form of the drawing in accordance with the display condition of the size value corresponding to the respective graphic form; and displaying the respective drawing on the display apparatus with the graphic forms of the drawing whose size value is not smaller than the corresponding display condition of the size value, wherein the plurality of different shapes of graphic forms comprise letters and the display conditions corresponding to letters determine whether to omit from displaying a respective letter or whether to replace the respective letter with a blocks said display condition variable by industry, and each graphic form being displayed based upon the display condition stored in a table in memory.

4. A method for displaying drawings with a CAD system, the CAD system comprising a display apparatus and a drawing storage unit which stores a plurality of drawings, each drawing stored in the drawing storage unit and defined at least by shape and size value, there being a plurality of different shapes of graphic forms and predetermined display conditions of the size value correspond, respectively, to each of the shapes of the graphic forms, the method comprising:

reading a respective drawing from the drawing storage unit;

comparing said size value of each graphic form of the drawing in accordance with the display condition of the size value corresponding to the respective graphic form; and displaying the respective drawing on the display apparatus with the graphic forms of the drawing whose size value is not smaller than the corresponding display condition of the size value, wherein the plurality of different shapes of graphic forms comprise free lines and the display conditions corresponding to free lines determine whether to omit from displaying, or not omit from displaying, a respective free line, said display conditions variable by industry, and each of the graphic forms being displayed based upon the display conditions stored in a table in memory.

5. A method for displaying drawings with a CAD system, the CAD system comprising a display apparatus and a drawing storage unit which stores a plurality of drawings, each drawing stored in the drawing storage unit and defined at least by shape and size value, there being a plurality of different shapes of graphic forms and predetermined display conditions of the size value correspond, respectively, to each of the shapes of the graphic forms, the method comprising:

reading a respective drawing from the drawing storage unit;

comparing said size value of each graphic form of the drawing in accordance with the display condition of the size value corresponding to the respective graphic form; and displaying the respective drawing on the display apparatus with the graphic forms of the drawing whose size value is not smaller than the corresponding display condition of the size value, wherein the plurality of different shapes of graphic forms comprise dimensional values and the display conditions corresponding to dimensional values determine whether to omit from displaying, or not omit from displaying, a respective dimensional value, said display conditions variable by industry, and each of the graphic forms being displayed based upon the display conditions stored in a table in memory.

6. A method for displaying drawings with a CAD system, the CAD system comprising a display apparatus and a drawing storage unit which stores a plurality of drawings, each drawing stored in the drawing storage unit and defined at least by shape and size value, there being a plurality of different shapes of graphic forms and predetermined display conditions of the size value correspond, respectively, to each of the shapes of the graphic forms, the method comprising:

reading a respective drawing from the drawing storage unit;

comparing said size value of each graphic form of the drawing in accordance with the display condition of the size value corresponding to the respective graphic form; and displaying the respective drawing on the display apparatus with the graphic forms of the drawing whose size value is not smaller than the corresponding display condition of the size value, wherein the plurality of different shapes of graphic forms comprise attribution information of the drawings and the display conditions corresponding to attribution information determine whether to allow standardized attribution information for each drawing, said display conditions variable by industry, and each of the graphic forms being displayed based upon the display conditions stored in a table in memory.

7. A CAD system retrieving a respective drawing from a plurality of drawings, said CAD system comprising:

a drawing storage unit storing the plurality of drawings, each of the drawings comprising graphic elements, each graphic element defined by at least a shape and a size value;

a memory storing a display condition corresponding to the size value and dependent upon a type of the each graphic element; and a display unit displaying the respective drawing with only the graphic elements of the drawing whose size value is at least as large as the corresponding display condition of the size value, the display conditions variable by industry, and each graphic element displayed based upon the display conditions stored in a table in the memory.

8. The system as set forth in claim 7, wherein:

the graphic elements comprise line segments; and the display conditions corresponding to the line segments require that a respective line segment is displayed when the length of the line segment is longer than a predetermined threshold value and that the line segment is not displayed when the length of the line segment is shorter than the predetermined threshold value.

9. The system as set forth in claim 8, wherein the predetermined threshold value can be changed.

10. The system as set forth in claim 7, wherein:

the graphic elements comprise one of circles and arcs; and the display conditions corresponding to the one of circles and arcs require that a respective one of the circles and arcs is displayed when the magnitude of the radius of the respective one of the circles and arcs is larger than a predetermined threshold value and that the respective one of the circles and arcs is not displayed when the magnitude of the radius of the respective one of the circles and arcs is smaller than the predetermined threshold value.

11. The system as set forth in claim 10, wherein the predetermined threshold value can be changed.

12. The system as set forth in claim 7, wherein the graphic elements comprise letters and the display conditions corresponding to the letters determine one of whether to omit displaying a respective letter and whether to replace the respective letter with a block.

13. The system as set forth in claim 12, wherein the display conditions corresponding to letters are determined in accordance with the industry or field in which the drawings are to be displayed.

14. The system as set forth in claim 12, wherein, when a respective letter is replaced with a block in accordance with the corresponding display conditions, the size of the block is made to correspond with the size of the letter.

15. The system as set forth in claim 7, wherein the graphic elements comprise free lines and the display conditions corresponding to the free lines determine whether to one of omit from displaying and not omit from displaying, a respective free line.

16. The system as set forth in claim 15, wherein the display conditions corresponding to free lines are determined in accordance with the industry or field in which the drawings are to be displayed.

17. The system as set forth in claim 7, wherein the graphic elements comprise dimensional values and the display conditions corresponding to the dimensional values determine whether to one of omit from displaying and not omit from displaying, a respective dimensional value.

18. The system as set forth in claim 17, wherein the display conditions corresponding to dimensional values are determined in accordance with the industry or field in which the drawings are to be displayed.

19. The system as set forth in claim 7, wherein the graphic elements comprise attribution information of the drawings and the display conditions corresponding to the attribution information determine whether to allow standardized attribution information for each drawing.

20. The system as set forth in claim 7, wherein the display unit comprises a screen display having a window region, the step of displaying the respective drawing, wherein the respective drawing is displayed in the window region of the screen display.

21. The system as set forth in claim 20, wherein each drawing has a corresponding identifier and the window of the screen display is divided into at least two regions, and wherein the identifiers of a plurality of drawings are simultaneously displayed in one region of the screen display, the respective drawing is selected by selecting the corresponding identifier, and the selected drawing is displayed with the corresponding reduced graphic forms of the designated drawing, the drawing being displayed in a region of the window other than the region in which the identifiers are displayed.

22. The system as set forth in claim 21, wherein the drawings corresponding to the displayed identifiers are selectively searched until a desired drawing with reduced graphic forms is displayed the desired drawing is retrieved from the drawing storage unit without reducing the graphic forms of the desired drawing, the identifiers are erased and the drawing displayed on the screen display, and the desired drawing is displayed, without reduced graphic forms, on the screen display.

* * * * *

UNITED STATES PATENT AND TRADEMARK OFFICE
CERTIFICATE OF CORRECTION

PATENT NO. : 5,859,643
DATED : January 12, 1999
INVENTOR(S) : Masahiro IIDA

It is certified that error appears in the above-identified patent and that said Letters Patent is hereby corrected as shown below:

Col. 5, line 25, delete "menu".

Col. 9, line 7, change "blocks" to --block,--.

Col. 12, line 21, after "displayed" insert --,--.

Signed and Sealed this

Thirteenth Day of July, 1999

Attest:

Attesting Officer

Q. TODD DICKINSON

Acting Commissioner of Patents and Trademarks